(12) United States Patent
Ettinger et al.

(10) Patent No.: US 9,467,620 B2
(45) Date of Patent: Oct. 11, 2016

(54) SYNTHETIC CAMERA LENSES

(71) Applicant: Google Inc., Mountain View, CA (US)

(72) Inventors: Scott Ettinger, San Carlos, CA (US);
David Lee, Mountain View, CA (US);
Evan Rapoport, Los Altos, CA (US);
Jake Mintz, Mountain View, CA (US);
Bryan Feldman, Mountain View, CA (US); Mikkel Crone Köser, Vanlose (DK); Daniel Joseph Filip, San Jose, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 14/596,776

(22) Filed: Jan. 14, 2015

(65) Prior Publication Data

US 2015/0244930 A1    Aug. 27, 2015

Related U.S. Application Data

(60) Provisional application No. 61/942,906, filed on Feb. 21, 2014.

(51) Int. Cl.
*H04N 5/232*        (2006.01)
*H04N 5/262*        (2006.01)

(52) U.S. Cl.
CPC ...... *H04N 5/23222* (2013.01); *H04N 5/23293* (2013.01); *H04N 5/2621* (2013.01)

(58) Field of Classification Search
CPC .................... H04N 5/23222; H04N 5/23293; H04N 5/232
See application file for complete search history.

(56) References Cited

U.S. PATENT DOCUMENTS 5,313,306 A * 5/1994 Kuban .............. G06F 17/30017
                                        348/240.99
6,359,650 B1 * 3/2002 Murakami ............. G06K 9/228
                                        348/333.04

\* cited by examiner

*Primary Examiner* — Tuan Ho
(74) *Attorney, Agent, or Firm* — Lerner, David, Littenberg, Krumholz & Mentlik, LLP (57) ABSTRACT

A method and system is disclosed for simulating different types of camera lens on a device by guiding a user through a set of images to be captured in connection with one or more desired lens effects. In one aspect, a wide-angle lens may be simulated by taking a plurality of images that have been taken at a particular location over a set of camera orientations that are determined based on the selection of the wide-angle lens. The mobile device may provide prompts to the user indicating the camera orientations for which images should be captured in order to generate the simulated camera lens effect.

20 Claims, 6 Drawing Sheets

SYNTHETIC CAMERA LENSES

CROSS-REFERENCES TO RELATED APPLICATIONS

The present application claims the benefit of the filing date of U.S. Provisional Application No. 61/942,906 filed on Feb. 21, 2014, the disclosure of which is hereby incorporated herein by reference.

BACKGROUND

Many mobile devices being used today include cameras, with most of these cameras being limited to a single camera lens. In some circumstances, a user of the mobile device may wish to create an image using a different type of camera lens than the one provided on their mobile device.

BRIEF SUMMARY

Aspects of the disclosure relate generally to simulating different types of camera lens on a device by guiding a user through a set of images to be captured in connection with one or more desired lens effects. For example, a wide-angle lens may be simulated by taking a plurality of images that have been taken at a particular location over a set of camera orientations that are determined based on the selection of the wide-angle lens. The mobile device may provide prompts to the user indicating the camera orientations for which images should be captured in order to generate the simulated camera lens effect.

One aspect of the disclosure provides a method for simulating a lens type. The method includes receiving, by one or more computing devices, a selection of a first lens type. The one or more computing devices, may then determine orientations of a camera for which images are to be captured to obtain image data usable for simulating the first lens type, wherein the determination is based at least in part on the first lens type. The method also includes providing for display, by the one or more computing devices, a representation of the camera's current orientation along with a plurality of visual indicia indicating camera orientations at which images are to be captured to obtain image data usable for the simulating the first lens type. The one or more computing devices may then receive captured images from the camera at a plurality of camera orientations, wherein the captured images include an image that has been captured at an orientation corresponding to the first indicia. In accordance with the method the one or more computing devices may also change a characteristic of a first indicia, from the plurality of visual indicia, based on the received image captured at the orientation corresponding to the first indicia. The method also includes determining, by the one or more computing devices, a simulated image corresponding to the first lens based at least in part on the captured images; and providing for display, by the one or more computing devices, the simulated image.

In determining the orientations of the camera for which images are to be captured, the one or more computing devices may base the determination on a first angle of view for a physical lens to be used in capturing the captured images and a second angle of view for the first lens type. In determining the simulated image the one or more computing devices may stitch the captured images together to form a stitched image. The stitched image may then be mapped onto a projection that corresponds to the first lens type.

In one example, the plurality of visual indicia displayed to the user comprises a plurality of discrete markers, wherein each marker corresponds to a different camera orientation. In another example, the first lens type may be a fisheye lens. In yet another example, the representation of the camera's current orientation may be represented by the current view being detected by the camera.

Another aspect of the disclosure provides for a method in which one or more computer devices may receive a selection of a first lens type; determine the orientations of a camera for which images are to be captured, wherein the determination is based at least in part on the first lens type; display a representation of a current orientation of the camera along with an indication of camera orientations for which images are to be captured; determine that images have been captured at the indicated camera orientations; combine the captured images so as to create a resultant image; and process the resultant image so as to produce a simulated image having an optical effect that corresponds to the first lens type.

Yet another aspect of the disclosure provides for a system that includes a camera, orientation component, one or more computing devices, and a memory. The orientation component outputs orientation data based on the orientation of the camera. The memory stores instructions accessible by the one or more computing devices.

The instructions may include receiving a selection of a first lens type; determining orientations of a camera for which images are to be captured to obtain image data usable for simulating the first lens type, wherein the determination is based at least in part on the first lens type; providing a representation of the camera's current orientation along with a plurality of visual indicia indicating camera orientations at which images are to be captured to obtain image data usable for the simulating the first lens type; receiving captured images from the camera at a plurality of camera orientations, wherein the captured images include an image that has been captured at an orientation corresponding to the first indicia; changing a characteristic of a first indicia, from the plurality of visual indicia, based on the received image captured at the orientation corresponding to the first indicia; determining a simulated image corresponding to the first lens based at least in part on the captured images; and providing for display the simulated image.

DETAILED DESCRIPTION

Overview

In one aspect of the disclosure, different types of camera lens may be simulated on a mobile device by guiding users through a set of images to be captured in connection with one or more desired lens effects. For example, a fisheye lens may be simulated by taking a plurality of images that have been taken at a particular location over a set of camera orientations that are determined based on the selection of the fisheye lens effect. In particular, the mobile device may provide prompts to the user indicating the camera orientations for which images should be captured in order to generate the simulated camera lens effect.

By way of example, a mobile device may simulate one of various camera lens types, including lens types that require an angle of view that is larger than the angle of view for the physical lens contained on the mobile device. For instance, the user may select a fisheye lens with a 180-degree viewing angle to be simulated by the mobile device.

Upon the user selecting a camera lens type, the mobile device may display an image based on the current orientation of the mobile device's physical camera lens along with visual indicia of additional orientations at which images are to be captured and used to create an image having the selected simulated lens type. In the case of a fisheye lens, indicia may be displayed proximate to the perimeter of the current camera view and then animated outwards to indicate the various portions of the scene to be captured in order simulate the selected lens. The indicia may include discrete markers, each of which corresponds with a particular orientation.

The user may then pan the mobile device's camera so as to capture images that correspond to the camera orientations designated by the indicia. When the camera captures an image at an orientation indicated by the indicia, the visual characteristics of the indicia may change, e.g., one of the aforementioned markers may disappear from the display. As the user pans the camera, the mobile device may also display an outline of a viewing area indicating the camera orientation for which images are currently being captured by the camera as it pans from one orientation to another.

Once a sufficient set of images have been captured, the mobile device may then combine the captured images so as to generate an image having an optical effect in accordance with the selected lens type. This image may then be displayed to the user on the mobile device.

Example Systems

Figure 1:
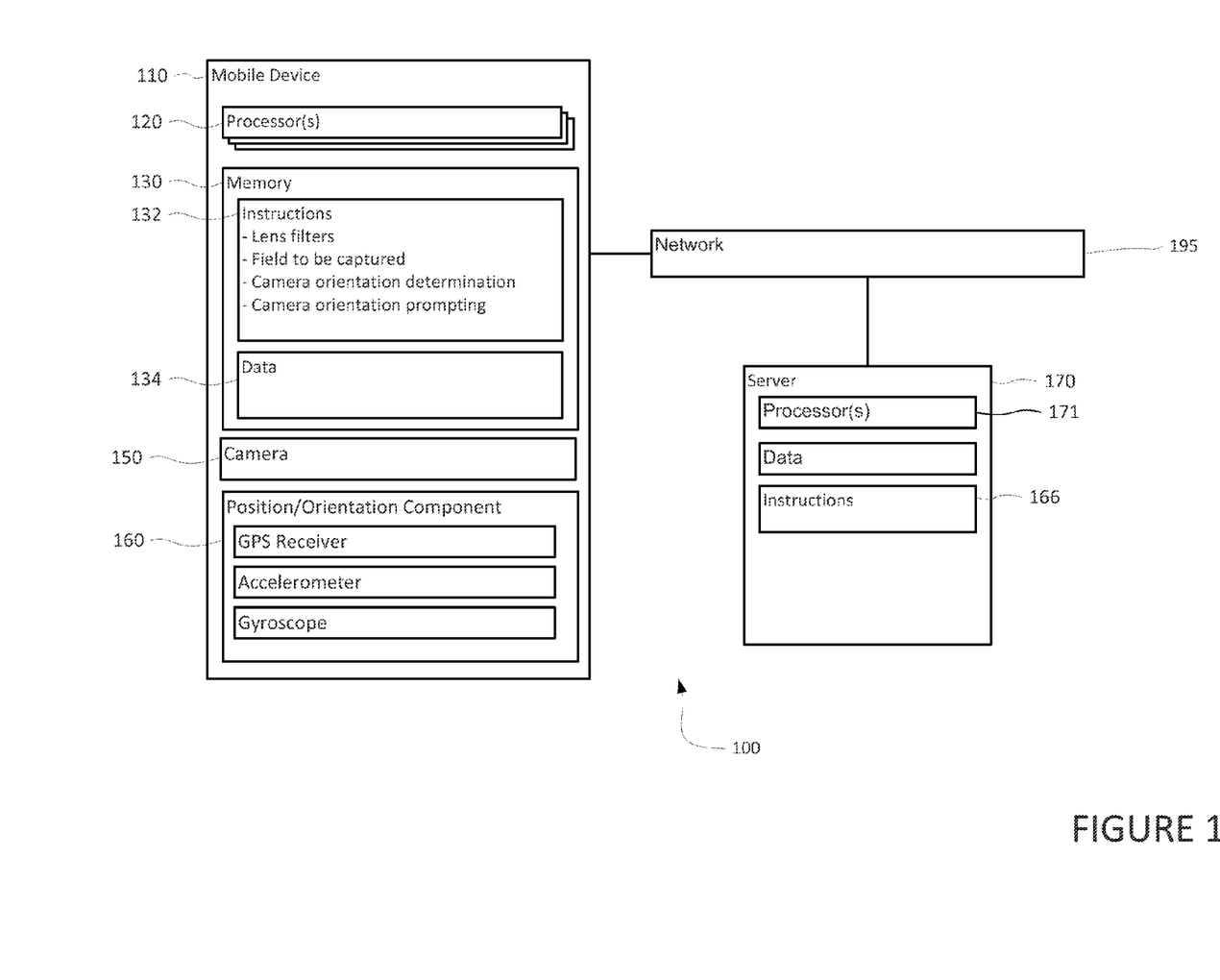
FIG. 1 is an example of a system that may be used to implement an aspect of the disclosure.

FIG. 1 depicts an example system 100 in which the features described above may be implemented. This example should not be considered as limiting the scope of the disclosure or usefulness of the features described herein. In this example, system 100 includes a computing device 110 as well as server 170. Computing device 110 may be a personal computing device intended for use by a user and have all of the components normally used in connection with a personal computing device such as a central processing unit (CPU), memory (e.g., RAM and internal hard drives) storing data and instructions, a display (e.g., a monitor having a rigid screen, a touch-screen, a projector, a television, a flexible display, or other device that is operable to display information), and user input device (e.g., keyboard, touch-screen or microphone). For example, computing device 110 may contain one or more processors 120, memory 130, camera 150, as well as position and orientation sensors 160. Memory 130 of computing device 110 store information accessible by processor 120, including instructions 132 that can be executed by the processor 120.

Memory also includes data 134 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 132 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 134 can be retrieved, stored or modified by processor 120 in accordance with the instructions 132. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 120 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing devices 110 and 170 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing device 110 and server 170. Accordingly, references to a processor, computer, computing device, or memory will be understood to include references to a collection of processors, computers, computing devices, or memories that may or may not operate in parallel. For example, the server 170 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 195.

The computing devices 110 and 170 can be at various nodes of a network 195 and capable of directly and indirectly communicating with other nodes of network 195. Although only a few computing devices are depicted in FIG.

1, it should be appreciated that a typical system can include a large number of connected computing devices, with each different computing device being at a different node of the network 195.

The network 195 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 170 may include one or more web servers that are capable of communicating with a storage system (not shown) as well as computing device 110 via network 195. For example, server computing devices 170 may use network 195 to transmit and present information to a user, such as users of computing device 110 on a display. In this regard, computing device 110 may be considered a client computing device and may perform all or some of the features described below. Server 170 may be configured similarly to the computing devices 110, with one or more processors, memory and instructions as described above. The client computing device may also include a camera for recording video streams, speakers, a network interface device, and all of the components used for connecting these elements to one another.

Figure 2:
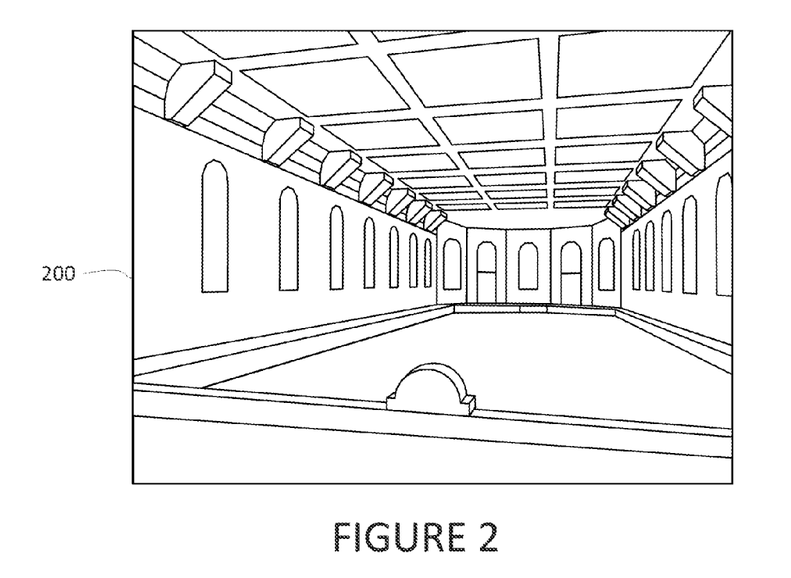
FIG. 2 is an example scene to be captured by system.
Figure 3:
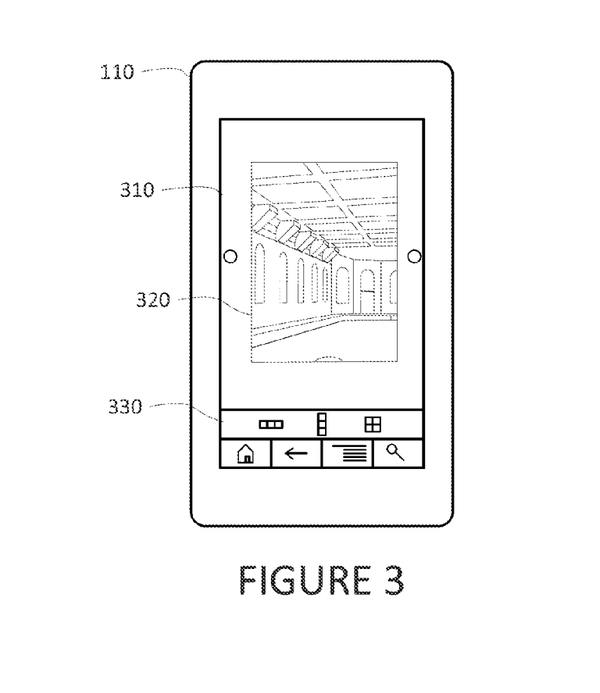
FIG. 3 is a screen shot of the scene shown in FIG. 2 being viewed through a camera on a mobile device.
Figure 4:
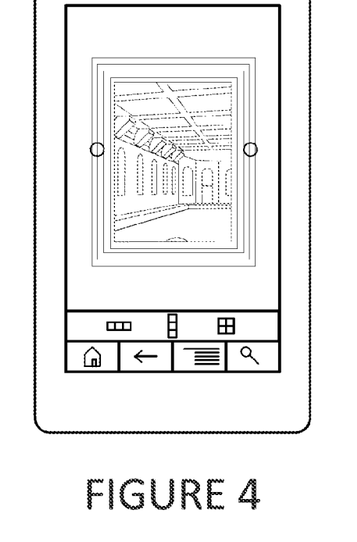
FIG. 4 is a screen shot of an animation that may be displayed in connection with the user zooming the camera in or out.

FIG. 2 shows scene 200. A user of device 110 may use camera 150 on device 110 to capture one or more images of scene 200. As shown in FIG. 3, display 310 of device 110 may display the view 320 that the camera of device 110 is currently capturing. As can be seen from view 320, camera 150 for device 110 is currently viewing a portion of scene 200 shown in FIG. 2. As the user moves device 110, the portion of scene 200 that is being viewed by camera 150 will change. Accordingly, the image shown in view 320 may also change in a corresponding manner, so as to display a different portion of scene 200. The user may also zoom in and out of the view that the camera is currently capturing. FIG. 4 is an example of an animation that may be displayed as the user zooms in on a portion of scene 200.

In accordance with one aspect of the disclosure, a user of device 1100 may select from a plurality of lens types, so that device 110 generates an image in accordance with the selected lens type. Some of the lens types selected by the user may correspond with physical lenses such that the image or images captured by camera 150 may be processed so as to generate an image that appears as if it were captured by the selected lens type. For instance, the various lens types selected by the user may differ in focal length, angle of view, and perspective.

For some lens types, the angle of view may be wider than the angle of view that is captured by the physical lens of camera 150. For example, a user may select a fisheye lens type, having an angle of view between 100 and 180 degrees, while the actual lens of camera 150 may have an angle of view less than 70 degrees. In this instance, device 110 may capture multiple images, which are then combined to generate an image consistent with the desired lens type. In addition, the select lens type may entail the simulation of optical effects. Accordingly, device 110 may process the captured image or images so as to simulate any optical effects associated with the selected lens types. For example, device 110 may process images captured by camera 150 so as to simulate the curvilinear distortion that is produced by a fisheye lens.

When a user selects a particular lens type, device 110 may determine the angle of view that should be captured for the selected lens type. In addition, a determination may be made as to whether the determined angle of view is wider than the angle of view that may be captured by the physical lens of camera 150. If the angle of view for the selected lens is wider than the angle of view for the physical camera lens, device 110 may need to capture multiple images at different camera orientations in order to generate an image in accordance with the selected lens type. Accordingly, device 110 may compare the angle of view for the selected lens and the angle of view for the physical camera lens so as to determine the specific camera orientations that will be needed in generating an image of the desired lens type. Device 110 may then provide an indication to the user that multiple images will be needed to generate the selected lens type.

Figure 5:
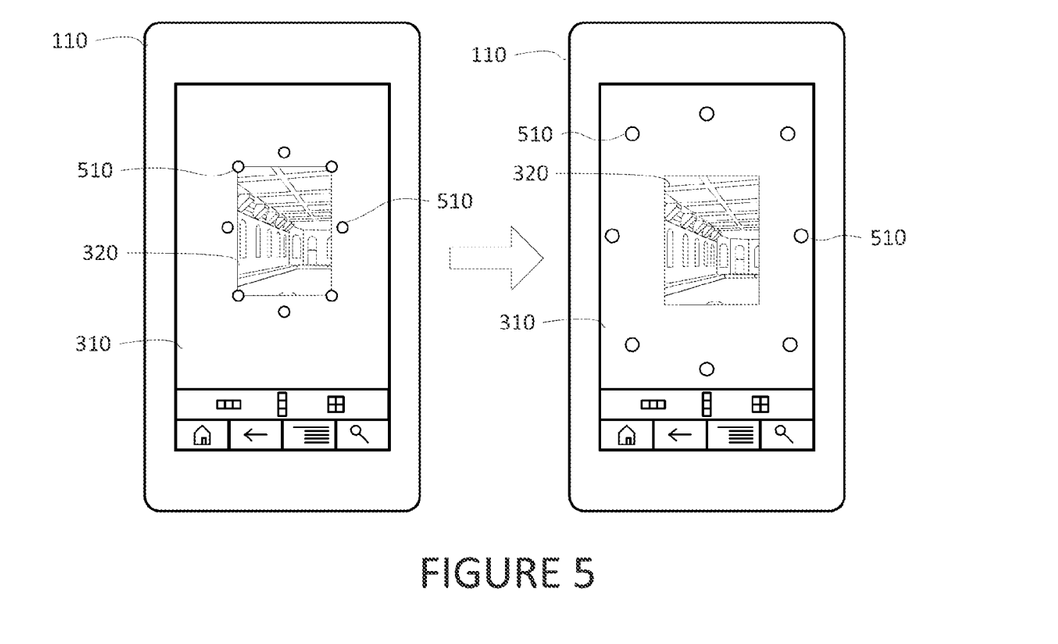
FIG. 5 illustrates an animation may be used to identify the field of view to be captured.

For example, FIG. 5 shows a display for device 110 upon a user selecting a 180 degree fisheye lens type. As user holds device 110 in a manner to capture the desired scene, device 110 may display the current view 320 of the camera lens. In addition, device 110 may display a set of markers 510, which are arranged relative to view 320 so as to indicate additional images that will need to be captured in order generate an image in accordance with the selected lens type. If the user zooms in or out of the viewed scene, markers 510 may move relative to the current view 320, so as to indicate the change in the current angle of view. For example, FIG. 5 shows markers 510 being moved toward the edges of display 310, as the user zooms in on the scene shown in view 320.

Figure 6:
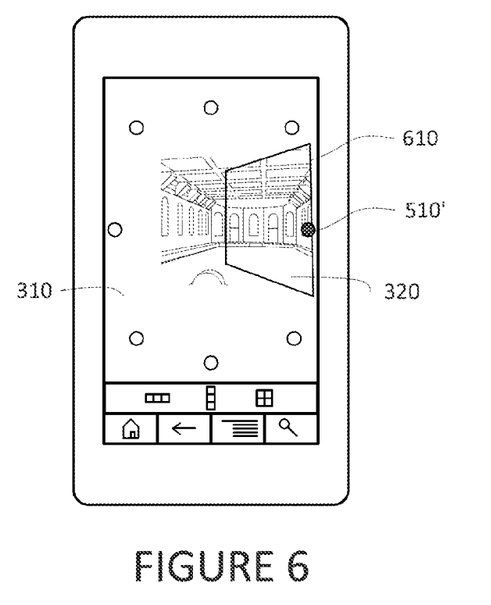
FIG. 6 is a screen shot of the capture of images at different camera angles.

The user may then begin to move device 110 so as to direct the current view 320 toward one or more of the markers 510 provided on display 310. For example, as seen in FIG. 6, the user may turn device 110 so that the camera begins to capture images toward the right-hand side of the scene. As the user turns the camera in this manner, display 310 may indicate a change in the current view of the camera relative to the markers 510. In particular, as the user turns device 110, the current view 320 within the display 310 may also move, so that it approaches marker 510'. The boundary of the current view 320 may be displayed as perimeter 610. Device 110 may also store position and orientation data for each captured image.

As shown in FIG. 1, client device 110 may include a geographic position component 160 in communication with the client device's processor for determining the geographic location of the device. For example, the position component may include a GPS receiver to determine the device's latitude, longitude and/or altitude position. The client device's location may also be determined using cellular tower triangulation, IP address lookup, and/or other techniques. The client devices may also include other devices such as an accelerometer, gyroscope, compass or another orientation detection device to determine the orientation of the client device. By way of example only, an acceleration device may determine the client device's pitch, yaw or roll (or changes thereto) relative to the direction of gravity or a plane perpendicular thereto. The client devices' provision of location and orientation data as set forth herein may be provided automatically to the user of device 110, server 170, as well as other computers via network 195.

Figure 7:
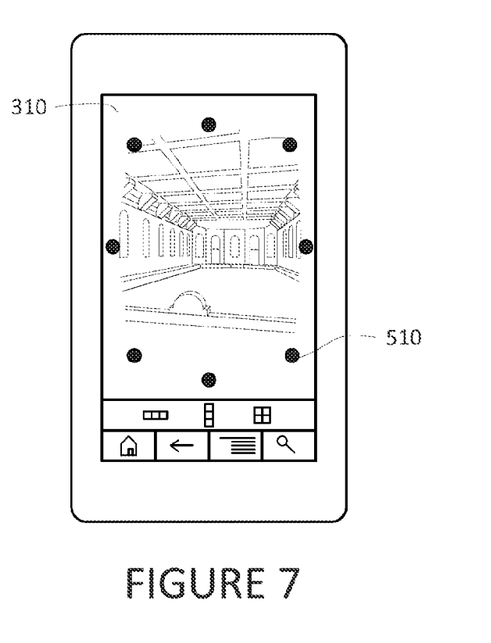
FIG. 7 is a screen shot of the images captured at different camera angles.

As the user moves the device 110 toward marker 510', device 110 may automatically capture the images that will be needed to generate an image in accordance with the selected lens type. For example, once the current view 320 reaches a point that corresponds with marker 510' on the right-hand side of display 310, an image of the current view 320 may be captured by the camera. In addition, device 110 may provide the user with an indication that an image corresponding to marker 510' has been captured. For example, the marker 510' may change in appearance or may disappear from display 310. For example, as shown in FIG. 6, the color of marker 510' has changed, indicating that the camera has captured an image that corresponds to marker 510'. Once the color of marker 510' has changed, the user may then proceed to change the orientation of device 110 so that the camera's current view 320 approaches each of the markers 510 shown on display 310. Images may then be taken at camera orientations that correspond to each marker 510 shown in display 310. As additional images are captured, display 310 may be filled in with an image of the captured areas, until each marker 510 indicates that a corresponding image has been captured. For example, display 310 shown in FIG. 7 indicates that images corresponding to each marker 510 have been captured.

Figure 8:
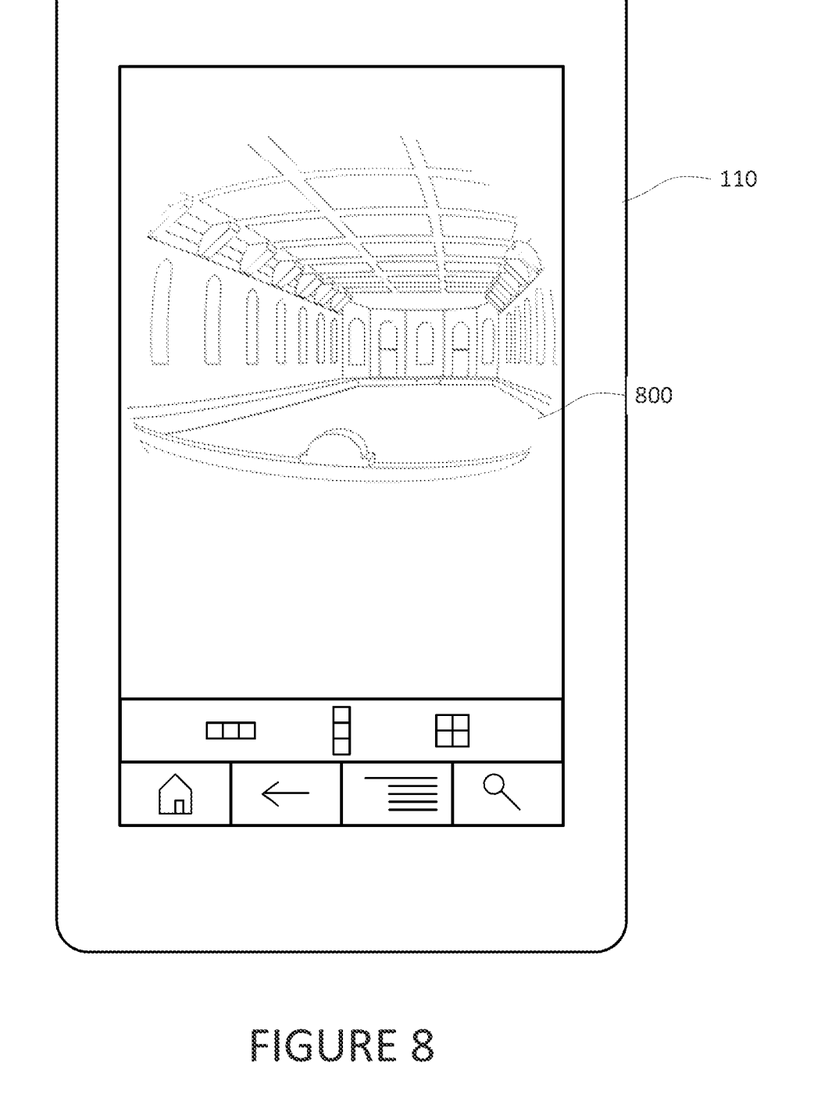
FIG. 8 is a screen shot of the application of a fish-eye lens filter to the image.

Upon capturing the plurality of images needed for the selected lens type, device 110 may then combine the captured images so as to generate a combined image. For example, the captured images may be combined through the process of image stitching. In addition, the stitched images may be processed so as to produce a desired optical effect for the selected lens type. For example, the stitched images may be mapped onto a particular projection, such as for example, rectilinear, cylindrical, spherical, Panini, or stereographic. As can be seen in FIG. 8, the images captured by device 110 have been processed so as to generate an image 800 having a projection consistent with a fisheye lens.

Figure 9:
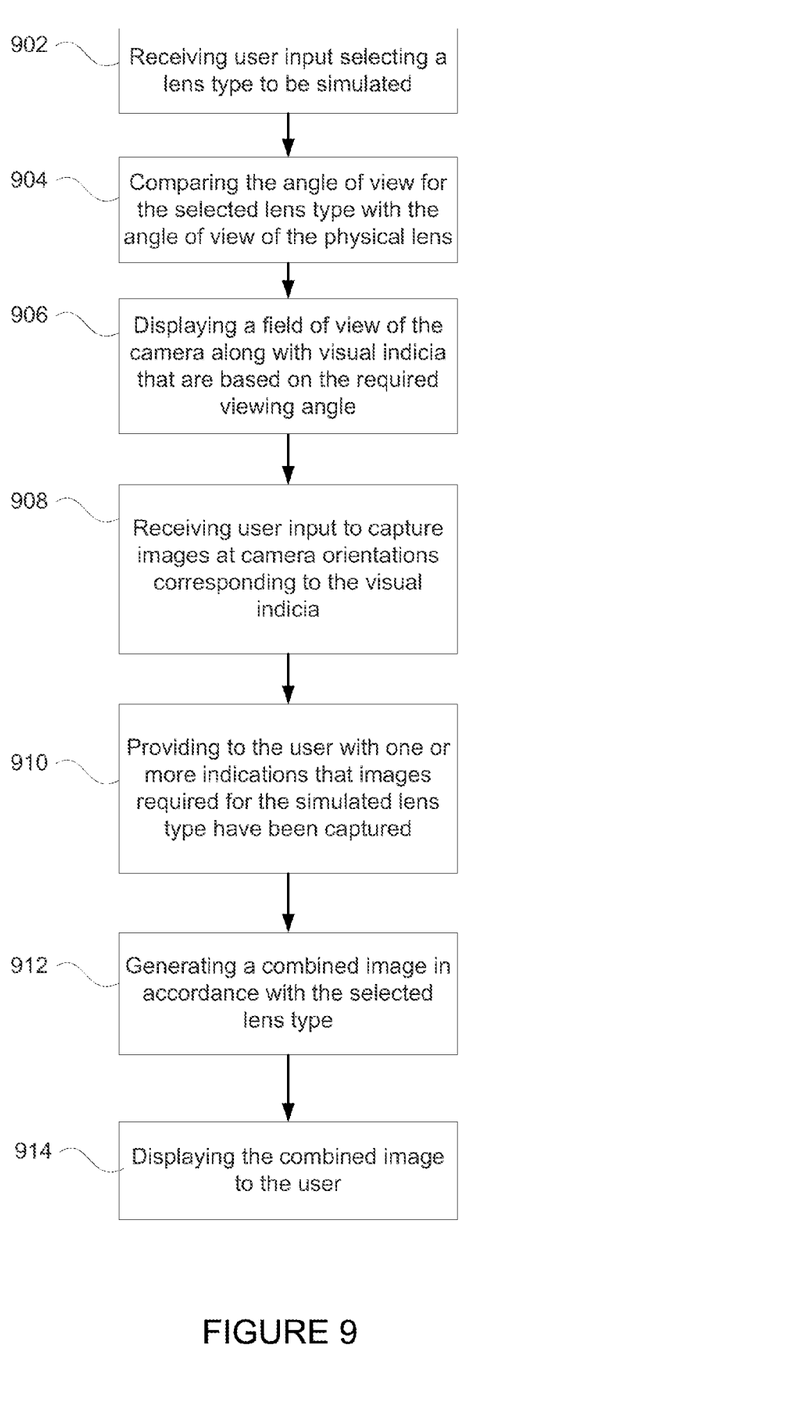
FIG. 9 is a flow describing an example of a method that may be used to implement various embodiments.

FIG. 9 is a flow chart for the aspects of the disclosed system described above. In block 902, the system may receive input from a user selecting a lens type to be simulated. A comparison of the angle of view for the selected lens type with the angle of view for the physical camera lens may then be made (block 904). Based on the comparison of the angles of view, a display may then be made to the user showing a field of view of the camera along with a visual indicia indicating camera orientations for which images are to be captured (block 906). User input is then received for capturing images at camera orientations that correspond to the visual indicia (block 908). The visual indicia may then provide the user with one or more indications that images have captured for the corresponding camera orientations (block 910). The captured images may then be combined and processed so as to generate a combined image in accordance with the selected lens type (block 912). The combined image may then be displayed to the user (block 914).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
   receiving, by one or more computing devices, a selection of a first lens type;
   determining, by the one or more computing devices, orientations of a camera for which images are to be captured to obtain image data usable for simulating the first lens type, wherein the determination is based at least in part on the first lens type;
   providing for display, by the one or more computing devices, a representation of the camera's current orientation along with a plurality of visual indicia indicating camera orientations at which images are to be captured to obtain image data usable for the simulating the first lens type;
   receiving, by the one or more computing devices, captured images from the camera at a plurality of camera orientations, wherein the captured images include an image that has been captured at an orientation corresponding to a first indicia from the plurality of visual indicia;
   changing, by the one or more computing devices, a characteristic of the first indicia, from the plurality of visual indicia, based on the received image captured at the orientation corresponding to the first indicia;
   determining, by the one or more computing devices, a simulated image corresponding to the first lens based at least in part on the captured images; and
   providing for display, by the one or more computing devices, the simulated image.

2. The method of claim 1, wherein the plurality of visual indicia displayed to the user comprises a plurality of discrete markers, wherein each marker corresponds to a different camera orientation.

3. The method of claim 1, wherein the first lens type is a fisheye lens.

4. The method of claim 1, wherein determining the orientations of the camera for which images are to be captured is based on a first angle of view for a physical lens to be used in capturing the captured images and a second angle of view for the first lens type.

5. The method of claim 1, wherein the determining of the simulated image further comprises stitching the captured images together to form a stitched image.

6. The method of claim 5, wherein the determining of the simulated image further comprises mapping the stitched image onto a projection that corresponds to the first lens type.

7. The method of claim 1, wherein the representation of the camera's current orientation comprises a current view being detected by the camera.

8. A method comprising:
   receiving, by one or more computing devices, a selection of a first lens type;
   determining, by the one or more computing devices, orientations of a camera for which images are to be captured, wherein the determination is based at least in part on the first lens type;
   providing for display, by the one or more computing devices, a representation of a current orientation of the camera along with an indication of camera orientations for which images are to be captured, the indication comprising a plurality of discrete markers for presentation to a user of the camera, each discrete marker corresponding to a different camera orientation;
   determining, by the one or more computing devices, that images have been captured at the indicated camera orientations;
   combining, by the one or more computing devices, the captured images so as to create a resultant image; and
   processing the resultant image, by the one or more computing devices, so as to produce a simulated image having an optical effect that corresponds to the first lens type.

9. The method of claim 8, further comprising, upon capture of one or more of the images at respective ones of the indicated camera orientations, modifying corresponding ones of the plurality of discrete markers to indicate the capture.

10. The method of claim 8, wherein the first lens type is a fisheye lens.

11. The method of claim 8, wherein determining the orientations of the camera for which images are to be captured is based on a first angle of view for a physical lens to be used in capturing the captured images and a second angle of view for the first lens type.

12. The method of claim 8, wherein combining the captured images further comprises stitching the captured images together to form a stitched image.

13. The method of claim 8, processing the resultant image further comprises mapping the resultant image onto a projection that corresponds to the first lens type.

14. The method of claim 8, wherein the representation of the camera's current orientation comprises a current view being detected by the camera.

15. A system comprising:
a camera;
an orientation component, wherein the orientation component outputs orientation data based on the orientation of the camera;
one or more computing devices; and
a memory storing instructions accessible by the one or more computing devices;
the instructions comprising:
receiving a selection of a first lens type;
determining orientations of a camera for which images are to be captured to obtain image data usable for simulating the first lens type, wherein the determination is based at least in part on the first lens type;
providing a representation of the camera's current orientation along with a plurality of visual indicia indicating camera orientations at which images are to be captured to obtain image data usable for the simulating the first lens type;
receiving captured images from the camera at a plurality of camera orientations, wherein the captured images include an image that has been captured at an orientation corresponding to a first indicia from the plurality of visual indicia;
changing a characteristic of the first indicia, from the plurality of visual indicia, based on the received image captured at the orientation corresponding to the first indicia;
determining a simulated image corresponding to the first lens based at least in part on the captured images; and
providing for display the simulated image.

16. The system of claim 15, wherein the plurality of visual indicia displayed to the user comprises a plurality of discrete markers, and wherein each marker corresponds to a different camera orientation.

17. The system of claim 15, wherein the first lens type is a fisheye lens.

18. The system of claim 15, wherein the determining of the orientations of the camera for which images are to be captured is based on a first angle of view for a physical lens to be used in capturing the captured images and a second angle of view for the first lens type.

19. The system of claim 15, wherein the determining of the simulated image further comprises stitching the captured images together to form a stitched image.

20. The system of claim 19, wherein the determining of the simulated image further comprises mapping the stitched image onto a projection that corresponds to the first lens type.

* * * * *